Patented May 9, 1939

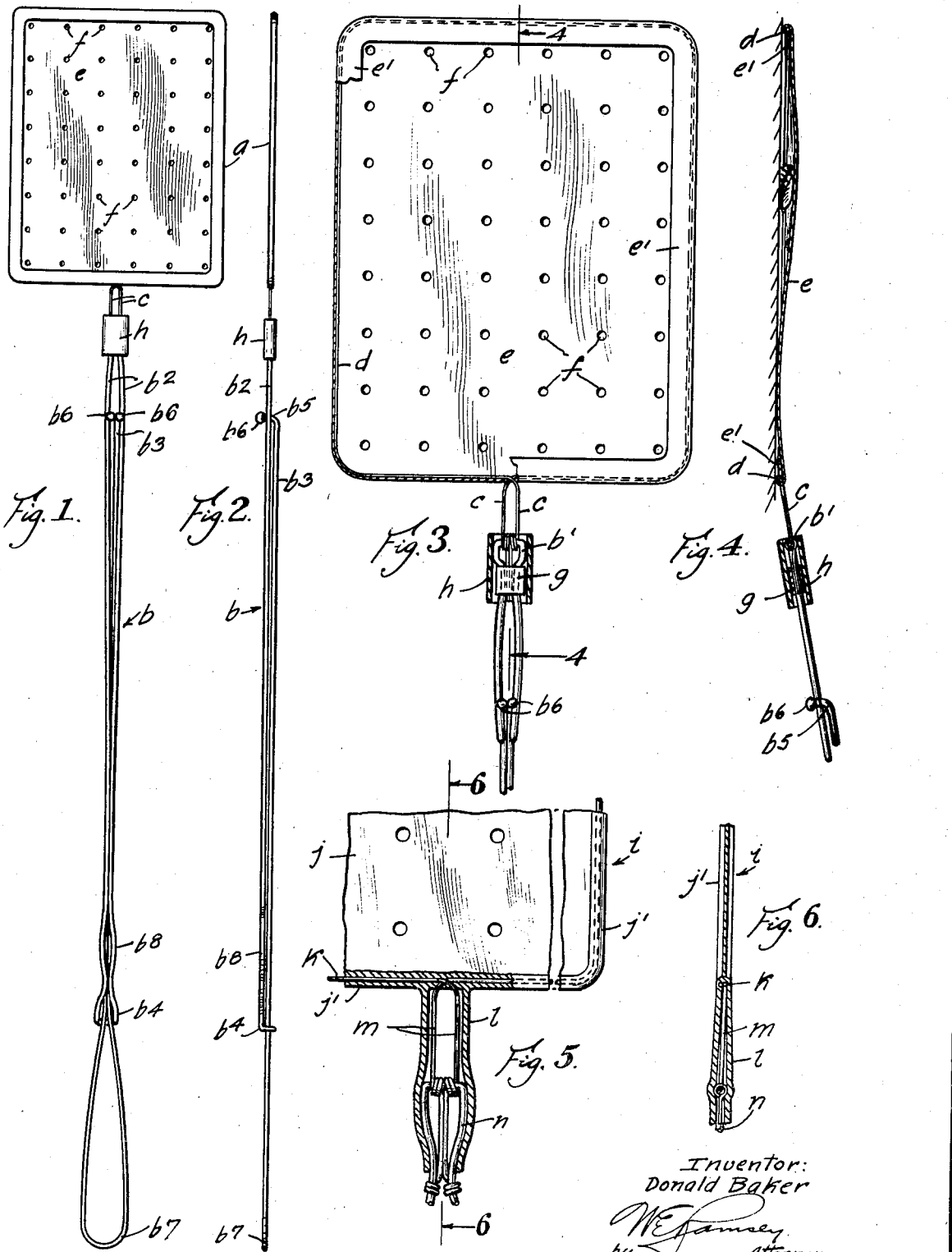

2,157,106

UNITED STATES PATENT OFFICE 2,157,106

FLY SWATTER

Donald Baker, Portland, Oreg., assignor of one-half to Agnes N. Mumford, Portland, Oreg.

Application March 16, 1936, Serial No. 68,986

3 Claims. (Cl. 43—137)

The object of my invention is to provide a fly swatter so constructed that it will kill flies without crushing them upon the wall or other surface upon which said fly alights.

This object is attained by making the head with an annular frame and a loosely drawn web lying across said frame. Said web is of light mass, is provided with few perforations and the head is joined to the handle by relatively flexible sections of resilient material. Thus, only a relatively light blow can be struck with the head and the force of this blow will be light even tho the handle is swung with great force. The web lying across the frame of the head tends to catch the air and the flexible connection between the head and the handle tends to permit said head to lag and said fly swatter must be used with a flail-like action. The looseness of the web causes it to form virtually a pocket and thus the movement of the web forward, independently of the frame but in connection therewith, is the only force utilized for killing the fly and this is insufficient to crush it.

Further objects of my invention are to provide a fly swatter which is simply constructed and which may be sold for a small sum and one which may be used upon highly polished surfaces.

A further object of my invention is to provide a fly swatter with an extensible handle which may be effectively used independently of the length of the handle. The action being flail-like, as previously described, is thus applicable with a short or long handle with equal facility.

Details of my invention and the mode of operation thereof are hereinafter described with reference to the accompanying drawing, in which:

Fig. 1 is an elevation of a fly swatter embodying my invention looking upon the face of the head thereof;

Fig. 2 is a similar elevation looking at the edge of said face;

Fig. 3 is an enlarged view of said head with a portion of the handle shown attached thereto, portions of the head being shown broken away disclose details of construction;

Fig. 4 is a section taken on the line 4—4 in Fig. 3 and diagrammatically illustrates the manner in which the web of the fly swatter pockets out to prevent the crushing of a fly upon a wall surface;

Fig. 5 is a fragmentary sectional view of a fly swatter of modified form, said figure showing a portion of the head and handle thereof; and Fig. 6 is a section taken on the line 6—6 in Fig. 5 and illustrates structural features in the modification shown in Fig. 5.

A fly swatter embodying my invention comprises a head $a$, a handle $b$ and a flexible connecting element $c$ joining the handle to the head. Said flexible section preferably is formed of thin wire, such as piano wire, and the wire is preferably formed into a loop $d$ defining the annular frame of said head. The web $e$ is preferably made of a lightweight sheet of rubber and the marginal edges $e'$ thereof are folded around the loop $d$ and secured in place. Said web is loosely drawn across said frame and is permitted to pocket out as is shown in Fig. 4. Said web is provided with a series of small perforations $f$ which occupy only a small proportion of the surface area of the face of said web.

The ends of the wire forming said flexible section are preferably looped about the end $b'$ of the handle and secured thereto by a metal ferrule $g$ which secures said ends in place and serves as a guard over the ends of said wire. Overlying said metal ferrule and the ends of said wire is tubular rubber bumper which provides a resilient surface to prevent injury to surfaces.

The handle $b$ is preferably formed of two sections, $b2$ and $b3$ which are extensibly joined together. The section $b$ forms the upper half of the handle, that is the end to which the head is secured. The two ends of a single piece of wire form the looped end $b'$ of said handle and said ends are joined together and held in abutment with each other by the metal ferrule $g$. The intermediate portions of said wire defining the opposite end of said member of said section $b2$ forms a loop $b4$ thru which the other sections $b3$ extends. The ends of the wire forming said section $b3$ are formed into offset lateral projecting pieces $b5$ extending between the courses of the wire forming the section $b2$ of the handle. Said offset laterally projecting features $b5$ preferably terminate in knob-like ends $b6$ which prevent their being retracted from place. The other end of said section $b3$ is formed into a rather open loop $b7$ which forms the extremity of the handle $b$. When the sections are arranged as shown in Fig. 1 the handle is arranged at its shortest over-all length. When said handle is extended the parts are drawn until the offset laterally projecting pieces $b5$ lie in the auxiliary loop $b8$ in the section $b2$.

In the modification shown in Fig. 5 the head $i$ of the fly swatter is formed of a molded section of rubber $j$ in which the marginal edges $j'$ envelop the looped wire *k* forming the frame of said head. A laterally projecting tubular section *l* is formed as an integral part of said section of rubber *j* and extends downwardly about the flexible connecting wire *m* and the end of the handle *n*. The two modifications are similar except that the rubber section is molded in the modification shown in Figs. 5 and 6, and includes said integral tubular section *l*. It is to be noted in Fig. 6 that the flexible connecting wire *m* is spaced from and is free of the lateral tubular section *l* and said tubular section thus does not bind the connecting wire nor limit its flexibility, unduly.

As has been briefly stated previously the fly swatter is provided with a relatively flail-like action and the head is of such light mass and presents such a large surface that it can only strike a wall a light blow. The frame serves to encircle the fly and tends to prevent a blast of air being formed as the head approaches the wall which would tend to blow the fly out from under the head. That is, the head as it approaches the wall first encircles the fly and the central loosely extending portion of the head then moves downwardly to slap the surface and to kill the fly without crushing it on said surface.

The end of the handle, protected either by the rubber bumper *h* or the lateral tubular section *l*, strikes the wall first and in advance of the head. When said end of the handle strikes the wall it causes the head to be flipped forward at an even faster speed to strike a sharp blow. The smallness of the perforations in the web tend to cause the latter to pocket out in the manner shown in Fig. 4 and the elasticity of the rubber web as well as its inertia in being thrown forward by the effect of the blow tend to cause it to slap the surface, as has previously been mentioned.

The flexible section *c* in the modification shown in Figs. 1 to 4, inclusive, is uncovered, and thus it is permitted to yield under its inherent elasticity. The flexible connecting wire *m* in Figs. 5 and 6 is similarly unaffected inasmuch as the tubular section *l* is spaced therefrom and the action of the connecting wire is stiffened only an inappreciable amount.

I claim:

1. A device of the character described, comprising a head and a handle, the head being provided with an elastic marginal frame and a rubber facing loosely secured to said frame.

2. A device of the character described, comprising a head and a handle, the head being provided with an elastic marginal frame and a webbed facing loosely and resiliently secured to said frame.

3. A device of the character described, comprising a head and an extensible handle, the head being provided with an elastic marginal frame and a webbed facing loosely and resiliently secured to said frame, the head and handle being secured by a highly flexible element, and a resilient member extending along said handle to a point spaced from said head, said member being spaced from said flexible element.

DONALD BAKER.